US010178092B2

(12) United States Patent
Abraham et al.

(10) Patent No.: US 10,178,092 B2
(45) Date of Patent: Jan. 8, 2019

(54) METHODS AND APPARATUS FOR PRIVATE SERVICE IDENTIFIERS IN NEIGHBORHOOD AWARE NETWORKS

(71) Applicant: QUALCOMM Incorporated, San Diego, CA (US)

(72) Inventors: Santosh Paul Abraham, San Diego, CA (US); Alireza Raissinia, Monte Sereno, CA (US); George Cherian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/542,328

(22) Filed: Nov. 14, 2014

(65) Prior Publication Data

US 2015/0143122 A1    May 21, 2015

Related U.S. Application Data

(60) Provisional application No. 62/022,135, filed on Jul. 8, 2014, provisional application No. 62/005,737, filed
(Continued)

(51) Int. Cl.
*H04L 29/06* (2006.01)
*H04L 9/32* (2006.01)
(Continued)

(52) U.S. Cl.
CPC ........ *H04L 63/0876* (2013.01); *H04L 9/3239* (2013.01); *H04W 12/02* (2013.01);
(Continued)

(58) Field of Classification Search
CPC ................ H04L 63/08; H04L 63/0876; H04L 2463/121; H04L 9/3236; H04L 9/3239;
(Continued)

(56) References Cited

U.S. PATENT DOCUMENTS 8,631,465 B2 * 1/2014 Ikeda .................. H04L 63/1433
726/2
8,789,204 B2 * 7/2014 Helander ................ G06F 21/51
715/240

(Continued)

FOREIGN PATENT DOCUMENTS

EP           1418719 A1    5/2004
WO    WO-2007024918 A2    3/2007
(Continued)

OTHER PUBLICATIONS

International Search Report and Written Opinion—PCT/US2014/065942—ISA/EPO—dated Mar. 11, 2015.

*Primary Examiner* — Zachary A. Davis
(74) *Attorney, Agent, or Firm* — Steven R. Thiel; Knobbe Martens Olson Bear

(57) ABSTRACT

Methods and apparatus in accordance with various embodiments provide for private service IDs for utilization in wireless devices in neighbor aware networks. One aspect of the subject matter described in the disclosure provides a method of transmitting service information in a wireless neighborhood aware network. The method includes generating a first message having a first service identifier. The first service identifier includes a first hash value based on a service name and timing information. The first hash value is generated by applying a first hash function. The method further includes transmitting the first message.

22 Claims, 8 Drawing Sheets

Related U.S. Application Data on May 30, 2014, provisional application No. 61/905,704, filed on Nov. 18, 2013.

(51) Int. Cl.

| | | |
|---|---|---|
| *H04W 12/06* | (2009.01) | |
| *H04W 12/08* | (2009.01) | |
| *H04W 12/02* | (2009.01) | |
| *H04W 12/10* | (2009.01) | |
| *H04W 8/00* | (2009.01) | |
| *H04W 48/08* | (2009.01) | |
| *H04W 84/12* | (2009.01) | |

(52) U.S. Cl.
CPC ........... *H04W 12/06* (2013.01); *H04W 12/08* (2013.01); *H04W 12/10* (2013.01); *H04L 2463/121* (2013.01); *H04W 8/005* (2013.01); *H04W 48/08* (2013.01); *H04W 84/12* (2013.01)

(58) Field of Classification Search
CPC .... H04L 9/3242; H04W 12/08; H04W 12/06; H04W 12/02; H04W 8/005; H04W 84/12
See application file for complete search history.

(56) References Cited

U.S. PATENT DOCUMENTS

| | | | |
|---|---|---|---|
| 2007/0141988 A1 | 6/2007 | Kuehnel et al. | |
| 2009/0089580 A1 | 4/2009 | Sugikawa | |
| 2009/0222530 A1* | 9/2009 | Buford | H04L 12/185 709/217 |
| 2014/0003433 A1* | 1/2014 | Narayanaswamy | H04L 67/327 370/392 |
| 2015/0142986 A1* | 5/2015 | Reznik | H04L 67/16 709/228 |

FOREIGN PATENT DOCUMENTS

| | | |
|---|---|---|
| WO | WO-2009009452 | 1/2009 |
| WO | WO-2013163634 A1 | 10/2013 |

* cited by examiner

| Field | Size (Octets) | Value (Hex) | Description |
|---|---|---|---|
| Attribute ID 401 | 1 | 0x06 | Identifies the attribute |
| Service ID 402 | 6 | Variable | Hash of a name of a service and information identifying a type of a message. |
| Service Control 403 | 1 | Variable | Field that defines the Service Control bitmap |
| Matching Filter Length 404 | 1 | Variable | An optional field present if a matching service discovery filter is associated |
| Matching Filter 405 | Variable | Variable | An optional field that is a sequence of length and value pairs that identify the matching service discovery filters |
| Service Response Filter Length 406 | 1 | Variable | An optional field present if a service response filter is used |
| Service Response Filter 407 | Variable | Variable | An optional field that is a sequence of length and value pairs that identify the matching service response filters |
| Service Info Length 408 | 1 | Variable | An optional field for service specific information |
| Service Info 409 | 1 | Variable | An optional field that contains the service specific information |

FIG. 4A

| Bit(s) | Information | Notes |
|---|---|---|
| 0 | Publish | If set to 1, indicates the message is a Publish type, otherwise set to 0. |
| 1 | Subscribe | If set to 1, indicates the message is a Subscribe type, otherwise set to 0. |
| 2 | Follow-up | If set to 1, indicates the message is a Follow-up type, otherwise set to 0. |
| 3 | Matching Filter Present | If set to 1, a Matching Filter field is present in the Service Descriptor Element, otherwise set to 0. |
| 4 | Service Response Filter Present | If set to 1, a Service Response Filter field is present in the Service Descriptor Element, otherwise set to 0. |
| 5 | Service Info Present | If set to 1, a Service Info field is present in the Service Descriptor Element, otherwise set to 0. |
| 6 | Privacy | Indicates whether the Service ID is a Private Service ID |
| 7-8 | Reserved | Reserved |

FIG. 4B

METHODS AND APPARATUS FOR PRIVATE SERVICE IDENTIFIERS IN NEIGHBORHOOD AWARE NETWORKS

CROSS REFERENCE TO RELATED APPLICATIONS

This application claims priority under 35 U.S.C. § 119(e) to U.S. Provisional Patent Application No. 61/905,704 entitled "METHODS AND APPARATUS FOR PRIVATE SERVICE IDENTIFIERS IN NEIGHBORHOOD AWARE NETWORKS" filed on Nov. 18, 2013 the disclosure of which is hereby incorporated by reference in its entirety. This application further claims priority under 35 U.S.C. § 119(e) to U.S. Provisional Patent Application No. 62/005,737, entitled "METHODS AND APPARATUS FOR PRIVATE SERVICE IDENTIFIERS IN NEIGHBORHOOD AWARE NETWORKS," filed May 30, 2014, assigned to the assignee hereof and incorporated herein by reference in its entirety. This application further claims priority under 35 U.S.C. § 119(e) to U.S. Provisional Patent Application No. 62/022,135, entitled "METHODS AND APPARATUS FOR PRIVATE SERVICE IDENTIFIERS IN NEIGHBORHOOD AWARE NETWORKS," filed Jul. 8, 2014, assigned to the assignee hereof and incorporated herein by reference in its entirety.

BACKGROUND

Field

The present application relates generally to wireless communications, and more specifically to systems, methods, and devices for private service identifiers in a neighborhood aware networks (NAN).

Background

In many telecommunication systems, communications networks are used to exchange messages among several interacting spatially-separated devices. Networks can be classified according to geographic scope, which could be, for example, a metropolitan area, a local area, or a personal area. Such networks would be designated respectively as a wide area network (WAN), metropolitan area network (MAN), local area network (LAN), wireless local area network (WLAN), a neighborhood aware network (NAN), or personal area network (PAN). Networks also differ according to the switching/routing technique used to interconnect the various network nodes and devices (e.g. circuit switching vs. packet switching), the type of physical media employed for transmission (e.g. wired vs. wireless), and the set of communication protocols used (e.g., Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

Devices in a wireless network can transmit and/or receive information to and from each other. To carry out various communications, the wireless devices can coordinate according to a protocol. As such, wireless devices can exchange information to coordinate their activities. Improved systems, methods, and wireless devices for coordinating transmitting and sending communications within a wireless network are desired.

SUMMARY

The systems, methods, devices, and computer program products discussed herein each have several aspects, no single one of which is solely responsible for its desirable attributes. Without limiting the scope of this invention as expressed by the claims which follow, some features are discussed briefly below. After considering this discussion, and particularly after reading the section entitled "Detailed Description," it will be understood how advantageous features of this invention include improved efficiency when introducing devices on a medium.

One aspect of the subject matter described in the disclosure provides a method of transmitting service information in a wireless neighborhood aware network. The method includes generating a first message comprising a first service identifier, wherein the first service identifier includes a first hash value based on a service name and timing information, wherein the first hash value is generated by applying a first hash function. The method further includes transmitting the first message.

Another aspect of the subject matter described in the disclosure provides an apparatus for transmitting service information in a wireless neighborhood aware network. The apparatus includes a processor configured to generate a first message comprising a first service identifier, wherein the first service identifier includes a first hash value based on a service name and timing information, wherein the first hash value is generated by applying a first hash function. The apparatus further includes a transmitter configured to transmit the first message.

Another aspect of the subject matter described in the disclosure provides an apparatus for transmitting service information in a wireless neighborhood aware network. The apparatus includes a means for generating a first message comprising a first service identifier, wherein the first service identifier includes a first hash value based on a service name and timing information, wherein the first hash value is generated by applying a first hash function. The apparatus further includes a means for transmitting the first message.

Another aspect of the subject matter described in the disclosure provides a non-transitory computer-readable medium comprising code that, when executed, causes an apparatus to: generate a first message comprising a first service identifier, wherein the first service identifier includes a first hash value based on a service name and timing information, wherein the first hash value is generated by applying a first hash function. The medium further includes code that, when executed, causes the apparatus to transmit the first message.

BRIEF DESCRIPTION OF THE DRAWINGS

FIG. 4A illustrates a data structure table for which a service ID of FIG. 3 can be utilized in accordance with certain embodiments.

FIG. 4B illustrates a data structure table for which a service control field of FIG. 4A can be utilized in accordance with certain embodiments.

DETAILED DESCRIPTION

Figure 1:
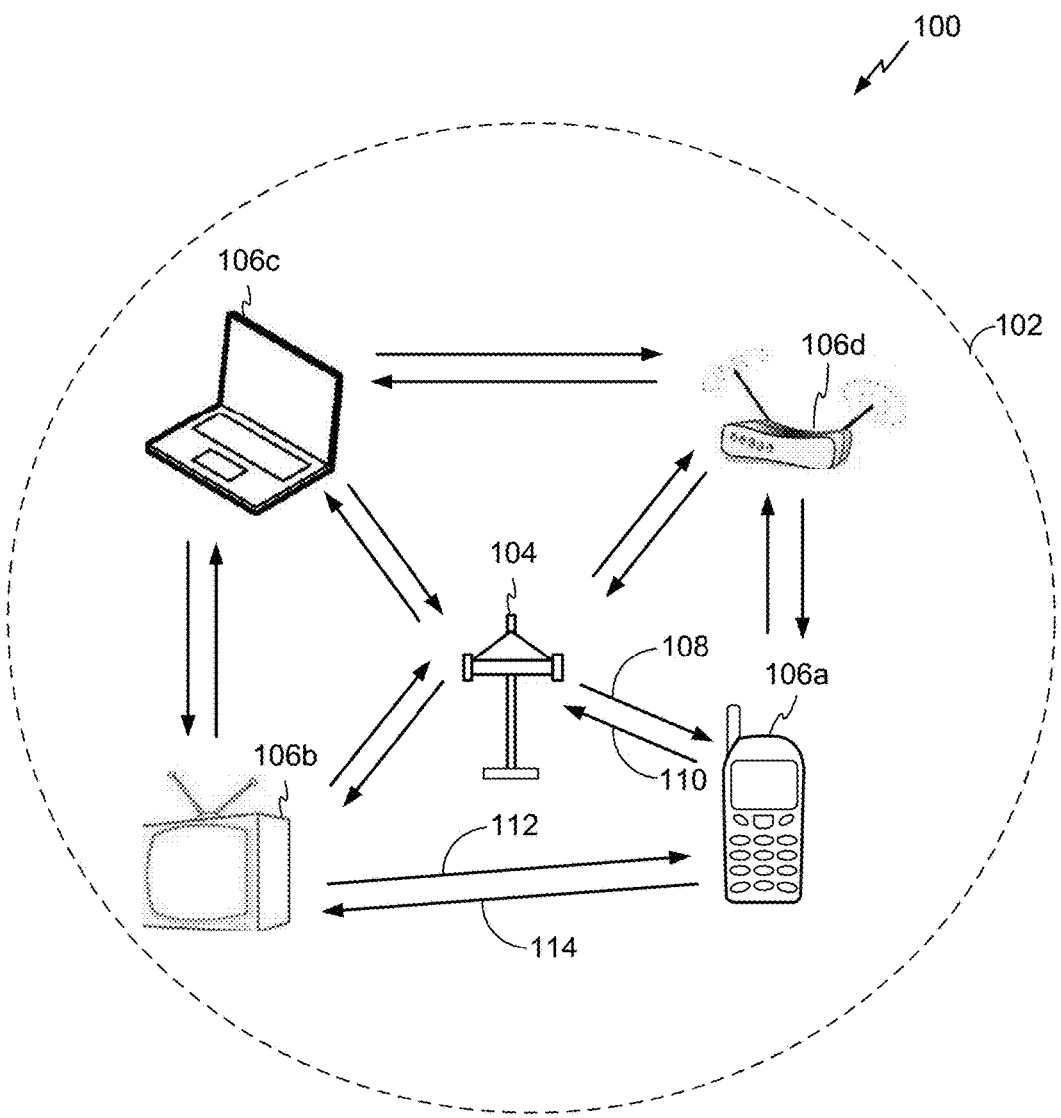
FIG. 1 illustrates an example of a wireless communication system in which aspects of the present disclosure can be employed in accordance with an embodiment.

The word "exemplary" is used herein to mean "serving as an example, instance, or illustration." Any embodiment described herein as "exemplary" is not necessarily to be construed as preferred or advantageous over other embodiments. Various aspects of the novel systems, apparatuses, and methods are described more fully hereinafter with reference to the accompanying drawings. This disclosure can, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the invention. For example, an apparatus can be implemented or a method can be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein can be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Popular wireless network technologies can include various types of wireless local area networks (WLANs). A WLAN can be used to interconnect nearby wireless devices together, employing widely used networking protocols. The various aspects described herein can apply to any communication standard, such as a wireless protocol.

In some implementations, a WLAN includes various wireless devices which are the components that access the wireless network. For example, there can be two types of wireless devices: access points ("APs") and clients (also referred to as stations, or "STAs"). In general, an AP can serve as a hub or base station for the WLAN and a STA serves as a user of the WLAN. For example, a STA can be a laptop computer, a personal digital assistant (PDA), a mobile phone, etc. In an example, a STA connects to an AP via a WiFi (e.g., IEEE 802.11 protocol) compliant wireless link to obtain general connectivity to the Internet or to other wide area networks. In some implementations a STA can also be used as an AP.

An access point ("AP") can also comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, or some other terminology.

A station "STA" can also comprise, be implemented as, or known as an access terminal ("AT"), a subscriber station, a subscriber unit, a mobile station, a remote station, a remote terminal, a user terminal, a user agent, a user device, user equipment, or some other terminology. In some implementations an access terminal can comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device or wireless device connected to a wireless modem. Accordingly, one or more aspects taught herein can be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

Wireless devices, such as a group of STAs, for example, can be used for neighborhood aware networking (NAN), or social-WiFi networking. For example, various stations within the network can communicate on a wireless device to wireless device (e.g., peer-to-peer communications) basis with one another regarding applications that each of the STAs supports. It is desirable for a discovery protocol used in a social-WiFi network to enable STAs to advertise themselves (e.g., by sending discovery packets) as well as discover services provided by other STAs (e.g., by sending paging or query packets), while ensuring secure communication and low power consumption. It should be noted that a discovery packet can also be referred to as a discovery message or a discovery frame. It should also be noted that a paging or query packet can also be referred to as a paging or query message or a paging or query frame.

FIG. 1 illustrates an example of a wireless communication system 100 in which aspects of the present disclosure can be employed in accordance with an embodiment. The wireless communication system 100 can operate pursuant to a wireless standard, such as an 802.11 standard. The wireless communication system 100 can include an AP 104, which communicates with STAs 106a-d. In some aspects, the wireless communication system 100 can include more than one AP. Additionally, the STAs 106 can communicate with other STAs 106. As an example, a first STA 106a can communicate with a second STA 106b. As another example, a first STA 106a can communicate with a third STA 106c although this communication link is not illustrated in FIG. 1.

A variety of processes and methods can be used for transmissions in the wireless communication system 100 between the AP 104 and the STAs 106 and between an individual STA, such as the first STA 106a, and another individual STA, such as the second STA 106b. For example, signals can be sent and received in accordance with orthogonal frequency-division multiplexing (OFDM)/orthogonal frequency-division multiple access (OFDMA) techniques. If this is the case, the wireless communication system 100 can be referred to as an OFDM/OFDMA system. Alternatively, signals can be sent and received between the AP 104 and the STAs 106 and between an individual STA, such as the first STA 106a, and another individual STA, such as the second STA 106b, in accordance with code division multiple access (CDMA) techniques. If this is the case, the wireless communication system 100 can be referred to as a CDMA system.

A communication link that facilitates transmission from the AP 104 to one or more of the STAs 106 can be referred to as a downlink (DL) 108, and a communication link that facilitates transmission from one or more of the STAs 106 to the AP 104 can be referred to as an uplink (UL) 110. Alternatively, a downlink 108 can be referred to as a forward link or a forward channel, and an uplink 110 can be referred to as a reverse link or a reverse channel.

A communication link can be established between STAs, such as during social-WiFi networking in a NAN. Some possible communication links between STAs are illustrated in FIG. 1. As an example, a communication link 112 can facilitate transmission from the first STA 106a to the second STA 106b. Another communication link 114 can facilitate transmission from the second STA 106b to the first STA 106a.

The AP 104 can act as a base station and provide wireless communication coverage in a basic service area (BSA) 102. The AP 104 along with the STAs 106 associated with the AP 104 and that use the AP 104 for communication can be referred to as a basic service set (BSS). It should be noted that the wireless communication system 100 may not have a central AP 104, but rather can function as a peer-to-peer network between the STAs 106. Accordingly, the functions of the AP 104 described herein can alternatively be performed by one or more of the STAs 106.

Figure 2:
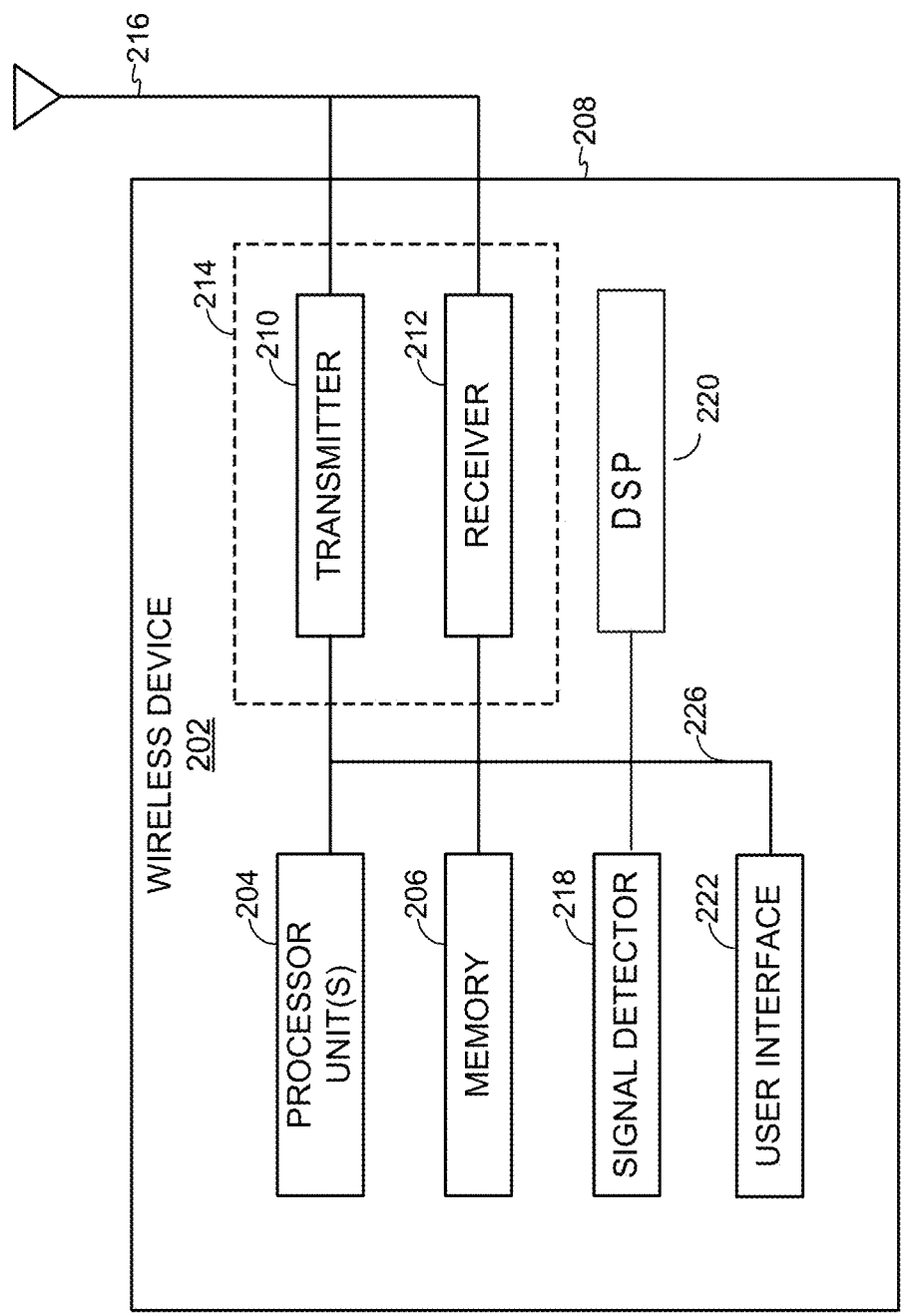
FIG. 2 illustrates a functional block diagram of a wireless device that can be employed within the wireless communication system of FIG. 1 in accordance with an embodiment.

FIG. 2 illustrates various components that can be utilized in a wireless device 202 that can be employed within the wireless communication system 100 in accordance with an embodiment. The wireless device 202 is an example of a wireless device that can be configured to implement the various methods described herein. For example, the wireless device 202 can comprise the AP 104 or one of the STAs 106.

The wireless device 202 can include a processor 204 which controls operation of the wireless device 202. The processor 204 can also be referred to as a central processing unit (CPU). Memory 206, which can include both read-only memory (ROM) and random access memory (RAM), can provide instructions and data to the processor 204. A portion of the memory 206 can also include non-volatile random access memory (NVRAM). The processor 204 typically performs logical and arithmetic operations based on program instructions stored within the memory 206. The instructions in the memory 206 can be executable to implement the methods described herein.

The processor 204 can comprise or be a component of a processing system implemented with one or more processors. The one or more processors can be implemented with any combination of general-purpose microprocessors, microcontrollers, digital signal processors (DSPs), field programmable gate arrays (FPGAs), programmable logic devices (PLDs), controllers, state machines, gated logic, discrete hardware components, dedicated hardware finite state machines, or any other suitable entities that can perform calculations or other manipulations of information.

The processing system can also include machine-readable media for storing software. Software shall be construed broadly to mean any type of instructions, whether referred to as software, firmware, middleware, microcode, hardware description language, or otherwise. Instructions can include code (e.g., in source code format, binary code format, executable code format, or any other suitable format of code). The instructions, when executed by the one or more processors, cause the processing system to perform the various functions described herein.

The wireless device 202 can also include a housing 208 that can include a transmitter 210 and/or a receiver 212 to allow transmission and reception of data between the wireless device 202 and a remote location. The transmitter 210 and receiver 212 can be combined into a transceiver 214. An antenna 216 can be attached to the housing 208 and electrically coupled to the transceiver 214. The wireless device 202 can also include (not shown) multiple transmitters, multiple receivers, multiple transceivers, and/or multiple antennas.

The transmitter 210 can be configured to wirelessly transmit packets having different packet types or functions. For example, the transmitter 210 can be configured to transmit packets of different types generated by the processor 204. When the wireless device 202 is implemented or used as an AP 104 or STA 106, the processor 204 can be configured to process packets of a plurality of different packet types. For example, the processor 204 can be configured to determine the type of packet and to process the packet and/or fields of the packet accordingly. When the wireless device 202 is implemented or used as an AP 104, the processor 204 can also be configured to select and generate one of a plurality of packet types. For example, the processor 204 can be configured to generate a discovery packet comprising a discovery message and to determine what type of packet information to use in a particular instance.

The receiver 212 can be configured to wirelessly receive packets having different packet types. In some aspects, the receiver 212 can be configured to detect a type of a packet used and to process the packet accordingly.

The wireless device 202 can also include a signal detector 218 that can be used in an effort to detect and quantify the level of signals received by the transceiver 214. The signal detector 218 can detect such signals as total energy, energy per subcarrier per symbol, power spectral density and other signals. The wireless device 202 can also include a digital signal processor (DSP) 220 for use in processing signals. The DSP 220 can be configured to generate a packet for transmission. In some aspects, the packet can comprise a physical layer data unit (PPDU).

The wireless device 202 can further comprise a user interface 222 in some aspects. The user interface 222 can comprise a keypad, a microphone, a speaker, and/or a display. The user interface 222 can include any element or component that conveys information to a user of the wireless device 202 and/or receives input from the user.

The various components of the wireless device 202 can be coupled together by a bus system 226. The bus system 226 can include a data bus, for example, as well as a power bus, a control signal bus, and a status signal bus in addition to the data bus. The components of the wireless device 202 can be coupled together or accept or provide inputs to each other using some other mechanism.

Although a number of separate components are illustrated in FIG. 2, one or more of the components can be combined or commonly implemented. For example, the processor 204 can be used to implement not only the functionality described above with respect to the processor 204, but also to implement the functionality described above with respect to the signal detector 218 and/or the DSP 220. Further, each of the components illustrated in FIG. 2 can be implemented using a plurality of separate elements.

Systems and methods in accordance with various embodiments provide for private service identifiers (IDs) for utilization in wireless devices (such as but not limited to STAs and APs) in NAN networks. A service ID may contain a hash of an input string (e.g., a service name) and may be carried in a service discovery frame (SDF). In a NAN, a service provider may publish the fact that it is providing a service using a publish function. For example, the publish function may be written as: publish(service_name, matching_filter_tx, matching_filter_rx, service_specific_info, configuration_parameters). Similarly, a device searching for a service may attempt to subscribe to the service using a subscribe function. For example, the subscribe function may be written as: subscribe(service_name, matching_filter_rx, matching_filter_tx, service_specific_info, configuration_parameters). A private service ID may comprise a service ID with additional privacy configuration parameters such that the service ID becomes encrypted. In certain embodiments, a private service ID may be generated as a hash value based on a service name and additional privacy configuration parameters. The additional privacy configuration parameters may be added to either the subscribe function, publish function or both and may comprise a privacy bit (as discussed further with reference to FIG. 4B) to indicate a private service ID setting and a service ID encryption key to encrypt a service name. In some embodiments, the additional privacy configuration parameters may be included in a software application to indicate a private service ID setting. In some aspects, the indication of a private service ID setting in the software application is separate and independent from the privacy bit indication of a private service ID setting. The hash value may be based on a service name, a service ID encryption key and/or timing information. Compared with systems that utilize a service ID as a hash value without privacy configuration parameters, systems that utilize a private service ID as a hash value based on a service ID encryption key and/or timing information enable encryption of the private service ID and allow for more privacy of a service in a NAN network.

In certain embodiments, wireless devices can provide services that other wireless devices can utilize. These services can be provided by software applications configured to execute on one wireless device while using information generated on another wireless device or information generated for another wireless device, such as but not limited to a game or social networking service. These services can be identified among wireless devices using a service ID within packetized communications among wireless devices. The size of a service ID can be variable, such as but not limited to six bytes.

As discussed above, a service ID encryption key and/or timing information can be utilized in generating the hash value to increase the privacy of the service IDs. A service ID generated as a hash value of a service name without privacy configuration parameters may allow third parties to determine which services are being used in an area and the frequency or length of use for a service. Third party monitoring of service use may be undesirable as a service provider or service user may not want their service use monitored. In certain embodiments, the likelihood of undesired third party monitoring of a service may decrease by generating a private service ID as a hash value of a service name, the hash value based on a service ID encryption key and/or timing information.

In certain embodiments, the privacy bit configuration parameter may indicate to a discovery engine to generate a service ID as a hash value based on the service name, the timing information, and/or the service ID encryption key. In other embodiments, a software application may indicate to a discovery engine to generate a service ID as a hash value based on the service name, the timing information, and/or the service ID encryption key. Other values may also be included in the hash computation, such as a cluster ID within the NAN or the current time of day (current UTC value). In certain embodiments, the service ID, which may be carried in a service discovery attribute of a SDF, may be set as follows: service ID=Truncate to 6 bytes of (HASH(service_name, service ID encryption key, timing information)). In some embodiments, the timing information may be a portion of a time stamp of the current discovery window (DW) with a number of the least significant bits removed (e.g., last 8, 16, 17 bits). In some embodiments, the timing information may be a time stamp value indicating a start time of the DW. In some embodiments, the timing information may be a time stamp value that is periodically sampled based on the DW. For example, in some aspects, the time stamp value comprises the start time of the DW and is sampled every $16^{th}$, $8^{th}$, $4^{th}$ $2^{nd}$, or every DW. In other aspects other sample periods are possible. In other embodiments, the timing information may be a rolling index or counter that measure the passing of a time interval. In other embodiments, the timing information may be the coordinated universal time (UTC) or other timing system. By basing the service ID in part on the timing information, the service ID may change values as the timing information changes (e.g., every 500 milliseconds) which may provide another layer of privacy because by generating new service IDs at each timing interval, third parties would have to decrypt each private service ID generated to obtain the service name.

In certain embodiments, the hash value may be generated through the utilization or applying of a hash function. A hash function is an algorithm that maps an input string of variable length to a hash value of a fixed length. In some embodiments, the input string may comprise a service name. Various types of hash functions may be utilized in certain embodiments disclosed herein (e.g., MD5, Secure Hash Algorithm (SHA), cyclic redundancy check (CRC), etc.). In some embodiments, computational limitations may limit the number of times a hash function may be used. For example, if a hash function requires a large of amount of computational power and/or time (e.g., SHA-256), using the hash function every discovery window may become impractical. To overcome some of these limitations, it may be beneficial to use more than one hash function or steps to generate the service ID.

In some embodiments, the discovery engine may use a combination of a high computation (HC) hash and a low computation (LC) hash. The LC hash requires lower computational power and/or less time than the HC hash. For example, the discovery engine or processor may compute a first service ID using a HC hash (e.g., SHA-256) as follows: service ID-1=Truncate to 6 bytes of (SHA-256 (service_name)). The discovery engine or processor may then compute a second service ID (and/or each subsequent service ID) using an LC hash (e.g., CRC-64, SHA-3, tiny encryption algorithm (TEA)) based at least in part on the first service ID as follows: service ID-2=Truncate to 6 bytes of (LCHash (ƒ (service ID-1, service ID encryption key, timing information))). In some embodiments, the function ƒ may comprise a concatenation of the service ID name, encryption key, and/or timing information. In other embodiments, the function ƒ may comprise a bitwise exclusive OR (XOR), or other bitwise operation, of the timing information (e.g., timestamp), service ID, and/or encryption key.

In embodiments where the discovery engine or processor uses a TEA hash, the hash function may be as follows: tea_code(long*v, long*k), where k is the encryption key to be used and where v is the value to be encrypted. In the TEA, the value k may comprise 128 bits. In some aspects, the discovery engine or processor may create the value k from the service ID-1 described above which may require padding to meet the 128 bit requirement. For example, since the service ID-1 comprises 48 bits, k may comprise service ID-1 padded with 80 bits of all "0" bits, all "1" bits, or a known combination of "1"s and "0"s. In another example, k may comprise a concatenation of the service ID-1 such that k=service ID-1|service ID-1|truncate (service ID-1). In some aspects, the discovery engine or processor may create the value v based on the timing information (e.g., timestamp or timing synchronization function) or on the timing information and one or more of a second encryption key, a nonce, a cluster identifier (ID), or a transmitter medium access control (MAC) address. The nonce may comprise a number that is announced by an anchor master node of the cluster. The discovery engine or processor may create the service ID-2 described above by truncating the result of the TEA using the computed values of k and v described above to 48 bits. Truncating may be desirable because the TEA generates a 64 bit result. Using the TEA may have certain benefits. For example, the TEA is highly resistant to cryptanalysis because it achieves complete diffusion (e.g., 1 bit difference in input causes approximates 32 bit differences in cipher text). Additionally, TEA requires low computation overhead.

Below is a sample code for the TEA algorithm described above:

```
tea_code(long*v, long* k)
{
/* long is 4 bytes. */
  unsigned long v0=v[0], v1=v[1];
  unsigned long k0=k[0], k1=k[1], k2=k[2], k3=k[3];
  unsigned long sum=0;
  unsigned long delta = 0x9e3779b9, n=32 ;
  while (n-- >0) {
    sum+= delta ;
    v0 += (v1<<4)+k0 ^ v1+sum ^ (v1>>5)+k1 ;
    v1 += (v0<<4)+k2 ^ v0+sum ^ (v0>>5)+k3 ;
  }
  v[0]=v0 ;
  v[1]=v1 ;
}
```

Some hash functions and encryption algorithms described herein may have certain data block size requirements. Accordingly, some hash functions and encryption algorithms may require some padding to accommodate the data block size requirements for each function. The padding may comprise any known (e.g., known by service provider and subscriber) pattern of bits to satisfy the block size requirements. For example, the pattern may comprise all "0" bits, all "1" bits, or a combination of "1"s and "0"s.

Typically, a hash function is referentially transparent where a same input string should map to a same hash value. Thereby, vice versa, a same hash value can be indicative of a same input string utilized to generate the same hash value. In certain embodiments, a received service ID as a received hash value can be compared with a reference hash value to determine a name of a service and an anticipated type of message that the received service ID is associated with. As discussed above, this mapping can lead to third parties determining the input string (service name) from a hash value and monitoring of certain services. In some embodiments, when a device receives a private service ID from a service provider via a publish function, the device may wish to subscribe to that service. In some aspects, the discovery engine creates the exact private service ID to be matched based on the hashing function used for the publish function so that the device may subscribe to the service. In some aspects, the discovery engine creates a private service ID to be matched based on the service name used for the publish function so that the device may subscribe to the service.

Figure 3:
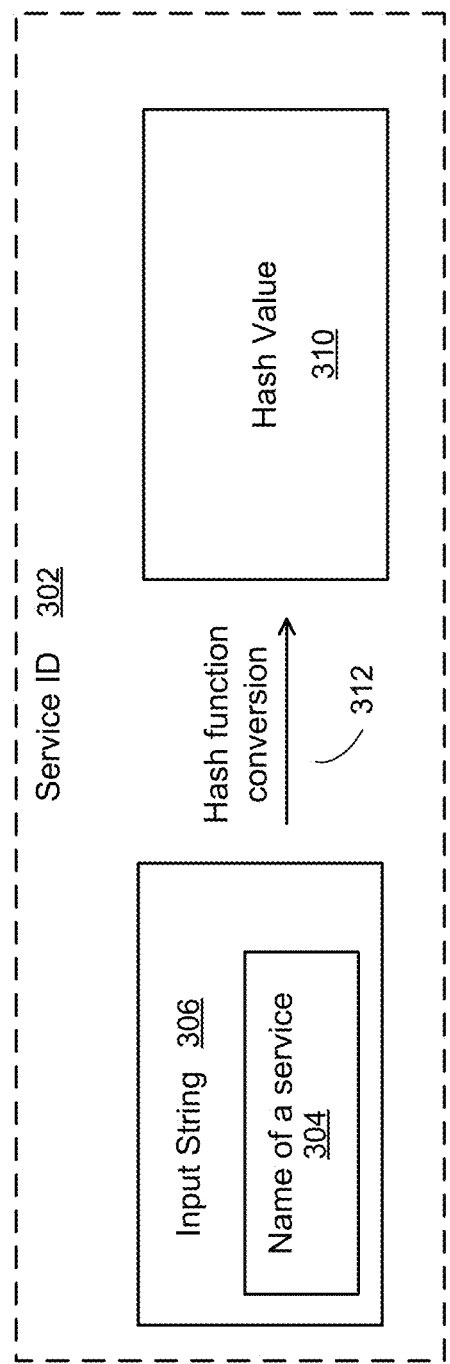
FIG. 3 is a conceptual diagram for generation of a service identifier (ID) that can be employed in the wireless communication system of FIG. 1 in accordance with an embodiment.

A conceptual diagram for generation of a service ID that can be employed in the wireless communication system of FIG. 1 is illustrated in FIG. 3 in accordance with certain embodiments. The conceptual diagram illustrates that an input string 306 including a name of a service 304 can be converted to a hash value 310 via a hash function 312. The service ID 302 can be used in packetized communications among wireless devices to identify a service. The service ID can be utilized in a field of a packet to identify a service, such as (but not limited to) an embodiment illustrated in FIGS. 4A and 4B.

A data structure in the form of a table for which a service ID 302 of FIG. 3 can be utilized in accordance with certain embodiments is illustrated in FIG. 4A. The table 400 illustrates how different fields of a packet can be communicated among wireless devices in a NAN network. Any type of attribute can be utilized in accordance with various embodiments, such as but not limited to a service discovery attribute or a service identifier attribute. The packet can include an attribute ID field 401 that identifies the attribute. The size of the field can be of one byte and the value of this field can be 0x06 (Hex). The packet can also include a service ID field 402 that contains a hash of a diversified input string, such as but not limited to a name of a service and information identifying a type of a message. The service ID field 402 can be of six bytes and of a variable value. The packet can also include a service control field 403 of one byte with a variable value that defines a service control bitmap. The packet can also include a matching filter length field 404 of one byte and a variable value. The matching filter length field 404 is an optional field present if a matching service discovery filter is associated with the attribute. A matching filter field 405 can also be included of a variable size and variable value. The matching filter field 405 can be an optional field that is a sequence of lengths and value pairs that identify the matching service discovery filters. A service response filter length field 406 can also be included of one byte and a variable value. The service response filter length field 406 can be an optional field and present if a service response filter is used. A service response filter field 407 can also be utilized of a variable size and variable value. The service response filter field 407 is a sequence of length and value pairs that identify the matching service response filters. An optional service info length field 408 can also be utilized of one byte and variable value for service specific information. A service information field 409 can also be utilized of one byte and variable value which contains the service specific information.

A data structure in the form of a table for which a service control field of FIG. 4A can be utilized in accordance with an embodiment is illustrated in FIG. 4B. The table 450 illustrates how different bits of the service control field of FIG. 4A can be communicated among wireless devices in a NAN network. The service control field may include a bit 0 that indicates whether the message is a publish type or not. The service control field may also include a bit 1 that indicates whether the message is a subscribe type or not. The service control field may also include a bit 2 that indicates whether the message is a follow-up type or not. The service control field may also include a bit 3 that indicates whether a matching filter field is present in a service descriptor element or not. The service control field may also include a bit 4 that indicates whether a service response filter is present in the service descriptor element or not. The service control field may also include a bit 5 that indicates whether a service information field is present in the service descriptor element or not. The service control field may also include a bit 6, the privacy bit, that indicates whether the service ID is a private service ID that is generated based on a service ID encryption key and/or timing information. The service control field may also include bits 7 and 8 which may be reserved for future use.

Figure 5:
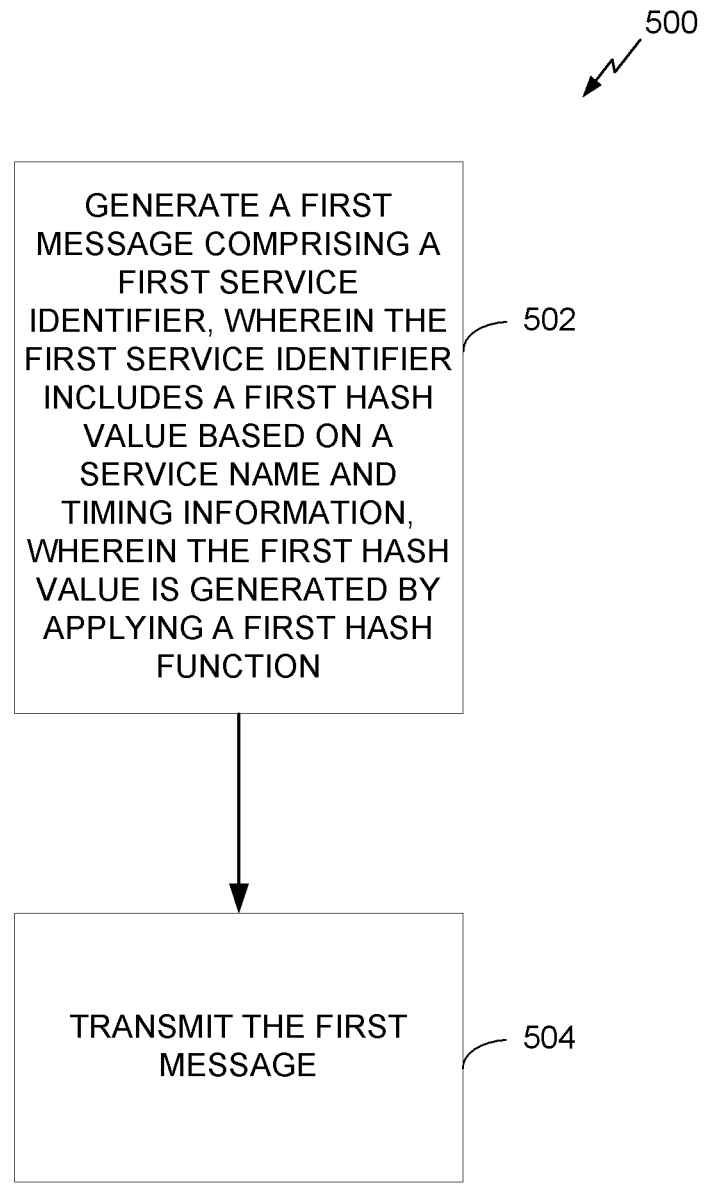
FIG. 5 is a flow chart of an aspect of an exemplary method for transmitting service information in a wireless neighborhood aware network (NAN).

A method for generating and transmitting a message with a service ID of FIG. 3 comprising a hash value of a service name, the hash value computed based on an encryption key and/or timing information is illustrated in FIG. 5 in accordance with an embodiment. In certain embodiments, the method 500 can be performed by a wireless device 202, such as but not limited to a processor 204, DSP 220, and a transmitter 210 of a wireless device 202. Although the method 500 in FIG. 5 is illustrated in a particular order, in certain embodiments the blocks herein may be performed in a different order, or omitted, and additional blocks can be added. A person of ordinary skill in the art will appreciate that the process of the illustrated embodiment may be implemented in any wireless device that can be configured to process and transmit a generated message.

At block 502, a wireless device generates a first message comprising a first service identifier, wherein the first service identifier includes a first hash value based on a service name and timing information, wherein the first hash value is generated by applying a first hash function. At block 504, the first message can then be transmitted from the wireless device. In certain embodiments, the timing information may comprise a portion of a time stamp value or comprise a value of a time interval counter.

In some embodiments, a wireless device can perform the method 500 of FIG. 5. In some embodiments, the wireless device can include a means for generating a first message comprising a first service identifier, wherein the first service identifier includes a first hash value based on a service name and timing information, wherein the first hash value is generated by applying a first hash function. In certain embodiments, the means for generating the first message can be configured to perform one or more of the functions with respect to block 502 (FIG. 5). In various embodiments, the means for generating the first message can be implemented by a processor 204 or DSP 220 (FIG. 2). In some embodiments, the means for generating may comprise a set of steps performed on a general purpose computer. For example, the computer may receive a request to create a private service ID. The computer may then apply an encryption key and/or timing information to a service ID. The computer may then use a hash function algorithm to generate a hash value of a service name that represents the private service ID based on the encryption key and/or timing information.

The wireless device can further include means for transmitting the first message. In certain embodiments, the means for transmitting can be configured to perform one or more of the functions described above with respect to block 504 (FIG. 5). In various embodiments, the means for transmitting can be implemented by a transmitter 210 (FIG. 2).

Figure 6:
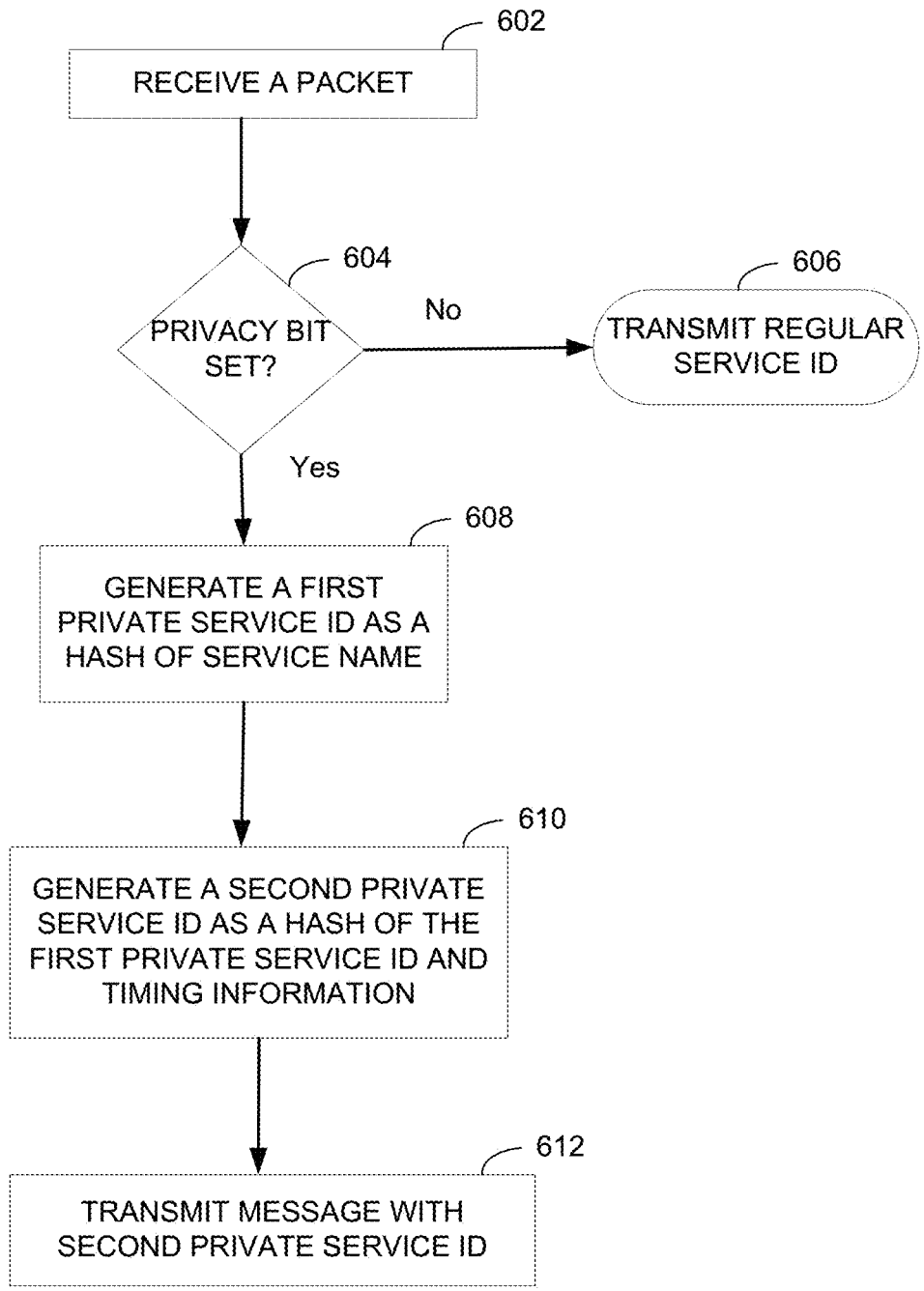
FIG. 6 is a flow chart of an aspect of an exemplary method for receiving service information in a wireless neighborhood aware network (NAN).

FIG. 6 is a flow chart of an aspect of an exemplary method 600 for transmitting service information in a wireless neighborhood aware network (NAN). In certain embodiments, the method 600 can be performed by a wireless device 202, such as but not limited to a processor 204, DSP 220, and a transmitter 210 of a wireless device 202. Although the method 600 in FIG. 6 is illustrated in a particular order, in certain embodiments the blocks herein may be performed in a different order, or omitted, and additional blocks can be added. A person of ordinary skill in the art will appreciate that the process of the illustrated embodiment may be implemented in any wireless device that can be configured to process and transmit a generated message.

At block 602, a wireless device may receive a packet. In some embodiments, the packet may comprise a service discovery frame. At block 604, the device may decode the packet and determine whether a privacy bit in the packet is set. If no, then at block 606, the device may transmit a message with a non-private service ID (e.g., service ID that is not encrypted). If the privacy bit is set, at block 608, the wireless device generates a first private service ID as a hash of the name of the service. In some embodiments, the wireless device may compute a first service ID using a HC hash (e.g., SHA-256) as discussed above. In some embodiments, the wireless device may transmit the message with the first service ID. At block 610, the wireless device may then compute a second service ID (and/or each subsequent service ID) using an LC hash (e.g., CRC-64, SHA-3, tiny encryption algorithm (TEA)) based at least in part on the first private service ID. For example, the second private service ID may be computed as follows: service ID-2=Truncate to 6 bytes of (LCHash (ƒ (service ID-1, service ID encryption key, timing information))). At block 612, the wireless device transmits a message with the second private service ID. In some embodiments, the message may comprise another service discovery frame. In some aspects, the wireless device may transmit the message with the second service ID after transmitting the message with the first service ID.

Figure 7:
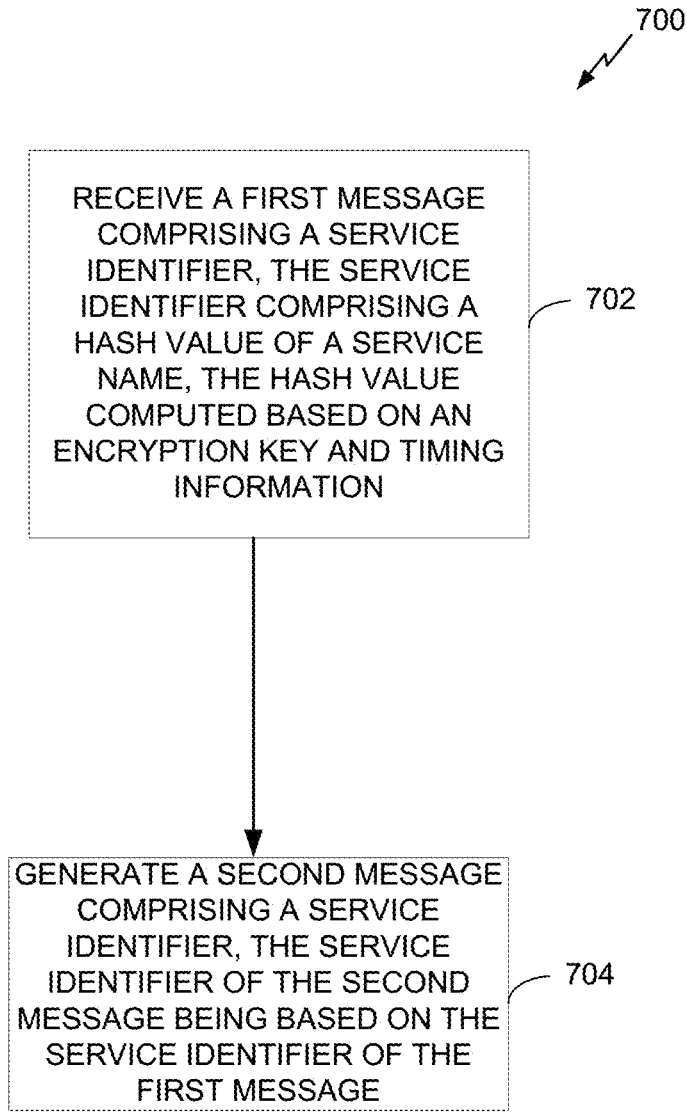
FIG. 7 is a flow chart of an aspect of an exemplary method for receiving service information in a wireless neighborhood aware network (NAN).

FIG. 7 illustrates a method 700 for generating and receiving a message with a service ID of FIG. 3 comprising a hash value of a service name, the hash value computed based on an encryption key and/or timing information in accordance with an embodiment. In certain embodiments, the method 700 can be performed by a wireless device 202, such as but not limited to a processor 204, DSP 220, and a receiver 212 of a wireless device 202. Although the method 700 in FIG. 7 is illustrated in a particular order, in certain embodiments the blocks herein may be performed in a different order, or omitted, and additional blocks can be added. A person of ordinary skill in the art will appreciate that the process of the illustrated embodiment may be implemented in any wireless device that can be configured to process and transmit a generated message.

At block 702, a first message including a service identifier, the service identifier comprising a hash value of a service name, the hash value computed based on an encryption key and/or timing information may be received via a wireless device. At block 704, a second message comprising a service identifier, the service identifier of the second message being based on the service name of the first message may be generated. In certain embodiments, the timing information may comprise a portion of a time stamp value or comprise a time interval counter.

In some embodiments, a wireless device that can be employed to perform a method 700 of FIG. 7 in the wireless communication system of FIG. 1. The wireless device can include a means for receiving a first message, wherein the first message comprises a service identifier, the service identifier comprising a hash value of a service name, the hash value computed based on an encryption key and/or timing information. In certain embodiments, the means for receiving a message can be configured to perform one or more of the functions with respect to block 702 (FIG. 7). In various embodiments, the means for receiving a message can be implemented by a receiver 212, processor 204, or DSP 220 (FIG. 2).

The wireless device can further include means for generating a second message comprising a service identifier, the service identifier of the second message being based on the service name of the first message. In certain embodiments, the means for generating can be configured to perform one or more of the functions described above with respect to block 704 (FIG. 7). In various embodiments, the means for generating can be implemented by a processor 204 or DSP 220 (FIG. 2). In some embodiments, the means for generating may comprise a set of steps performed on a general purpose computer. For example, the computer may receive a first message comprising a private service ID. The computer may then apply an encryption key and/or timing information to a service ID. The computer may then use a hash function algorithm to generate a hash value of a service name that matches the private service ID of the first message.

To illustrate how certain blocks in FIGS. 5-7 can be implemented, in certain embodiments, a searching wireless device can be configured to search for a service. The searching wireless device can generate a subscribe message (or a subscribe service request message) including a service identifier, the service identifier comprising a hash value of a name of a sought service, the hash value computed based on an encryption key and/or timing information (block 502). The searching wireless device can also transmit the generated message (block 504).

A service providing device can receive a subscribe message (or a subscribe service request message) including the service ID as the hash value of the service name, the hash value computed based on an encryption key and/or timing information (block 702). In some embodiments, the service providing device can generate a publish message (or a publish service announcement message) comprising a service identifier, the service identifier of the second message being based on the service name of the subscribe message (block 704). In some embodiments, the service providing device may also generate a combination of the publish and the subscribe message to both publish service and subscribe to the service.

It should be understood that any reference to an element herein using a designation such as "first," "second," and so forth does not generally limit the quantity or order of those elements. Rather, these designations can be used herein as a convenient method of distinguishing between two or more elements or instances of an element. Thus, a reference to first and second elements does not mean that only two elements can be employed there or that the first element can precede the second element in some manner. Also, unless stated otherwise a set of elements can include one or more elements.

A person/one having ordinary skill in the art would understand that information and signals can be represented using any of a variety of different technologies and techniques. For example, data, instructions, commands, information, signals, bits, symbols, and chips that can be referenced throughout the above description can be represented by voltages, currents, electromagnetic waves, magnetic fields or particles, optical fields or particles, or any combination thereof.

A person/one having ordinary skill in the art would further appreciate that any of the various illustrative logical blocks, modules, processors, means, circuits, and algorithm steps described in connection with the aspects disclosed herein can be implemented as electronic hardware (e.g., a digital implementation, an analog implementation, or a combination of the two, which can be designed using source coding or some other technique), various forms of program or design code incorporating instructions (which can be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans can implement the described functionality in varying ways for each particular application, but such implementation decisions should not be interpreted as causing a departure from the scope of the present disclosure.

The various illustrative logical blocks, modules, and circuits described in connection with the aspects disclosed herein and in connection with the above FIGS. can be implemented within or performed by an integrated circuit (IC), an access terminal, or an access point. The IC can include a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and can execute codes or instructions that reside within the IC, outside of the IC, or both. The logical blocks, modules, and circuits can include antennas and/or transceivers to communicate with various components within the network or within the device. A general purpose processor can be a microprocessor, but in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration. The functionality of the modules can be implemented in some other manner as taught herein. The functionality described herein (e.g., with regard to one or more of the accompanying figures) can correspond in some aspects to similarly designated "means for" functionality in the appended claims.

If implemented in software, the functions can be stored on or transmitted over as one or more instructions or code on a computer-readable medium. The steps of a method or algorithm disclosed herein can be implemented in a processor-executable software module which can reside on a computer-readable medium. Computer-readable media includes both computer storage media and communication media including any medium that can be enabled to transfer a computer program from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm can reside as one or any combination or set of codes and instructions on a machine readable medium and computer-readable medium, which can be incorporated into a computer program product.

It is understood that any specific order or hierarchy of steps in any disclosed process is an example of a sample approach. Based upon design preferences, it is understood that the specific order or hierarchy of steps in the processes can be rearranged while remaining within the scope of the present disclosure. The accompanying method claims present elements of the various steps in a sample order, and are not meant to be limited to the specific order or hierarchy presented.

Various modifications to the implementations described in this disclosure can be readily apparent to those skilled in the art, and the generic principles defined herein can be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein to mean "serving as an example, instance, or illustration." Any implementation described herein as "exemplary" is not necessarily to be construed as preferred or advantageous over other implementations.

Certain features that are described in this specification in the context of separate implementations also can be implemented in combination in a single implementation. Conversely, various features that are described in the context of a single implementation also can be implemented in multiple implementations separately or in any suitable sub-combination. Moreover, although features can be described above as acting in certain combinations and even initially claimed as such, one or more features from a claimed combination can in some cases be excised from the combination, and the claimed combination can be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method of transmitting service information in a wireless neighborhood aware network, comprising:
generating, by a wireless device, a first message comprising a first service identifier, wherein the first service identifier includes a first hash value based on a service name and timing information, wherein the timing information changes over time and those changes cause changes in the first hash value over time enhancing privacy of a service identified by the first service identifier and decreasing a likelihood of a third party monitoring use of the service, wherein the first hash value is generated by applying a first hash function;
transmitting the first message by the wireless device to a different wireless device during a first discovery window,
wherein the timing information comprises a portion of a first time stamp value, wherein the first time stamp value comprises a time stamp value of the first discovery window, and wherein the time stamp value is periodically sampled based on a start time of the first discovery window;
generating a second message, the second message comprising a second service identifier, wherein the second service identifier includes a second hash value based on the service name and a second time stamp value; and
transmitting the second message.

2. The method of claim 1, wherein the first hash value is further based on an encryption key.

3. The method of claim 1, wherein the second time stamp value comprises a time stamp value based on a start time of a second discovery window periodically sampled once every 16th, 8th, 4th, 2nd or every discovery window with respect to the first discovery window.

4. The method of claim 1, wherein the timing information comprises a value of a time interval counter.

5. The method of claim 1, wherein the first message comprises one of: a publish service announcement message; a subscribe service request message; or a combination of the publish service announcement message and the subscribe service request message.

6. The method of claim 1, wherein the first hash function comprises one of a secure hash algorithm (SHA), a cyclic redundancy check (CRC), or a tiny encryption algorithm (TEA).

7. The method of claim 1, further comprising generating a third message, the third message comprising a third service identifier, wherein the third service identifier includes a third hash value based at least in part on the first service identifier, wherein the third hash value is generated by applying a second hash function, and wherein applying the first hash function requires more computation than applying the second hash function.

8. The method of claim 1, wherein the first hash function comprises a tiny encryption algorithm (TEA), and wherein the first hash value is further based on an encryption key.

9. The method of claim 8, wherein the first hash value is further based on at least one of a second encryption key, a nonce, a cluster identifier (ID), and a transmitter medium access control (MAC) address.

10. The method of claim 9, wherein the nonce comprises a number announced by a node.

11. An apparatus for transmitting service information in a wireless neighborhood aware network, comprising:

a processor configured to generate a first message comprising a first service identifier and to generate a second message comprising a second service identifier, wherein the first service identifier includes a first hash value based on a service name and timing information, wherein the timing information changes over time and those changes cause changes in the first hash value over time enhancing privacy of a service identified by the first service identifier and decreasing a likelihood of a third party monitoring use of the service, wherein the first hash value is generated by applying a first hash function, and wherein the second service identifier includes a second hash value based on the service name and a second time stamp value;

a transmitter configured to transmit the first message to a wireless device during a first discovery window and to transmit the second message, wherein the timing information comprises a portion of a first time stamp value, wherein the first time stamp value comprises a time stamp value of the first discovery window, and wherein the time stamp value is periodically sampled based on a start time of the first discovery window.

12. The apparatus of claim 11, wherein the first hash value is further based on an encryption key.

13. The apparatus of claim 11, wherein the timing information comprises a value of a time interval counter.

14. The apparatus of claim 11, wherein the first message comprises one of: a publish service announcement message; a subscribe service request message; or a combination of the publish service announcement message and the subscribe service request message.

15. An apparatus for transmitting service information in a wireless neighborhood aware network, comprising:

means for generating, by the apparatus, a first message comprising a first service identifier, wherein the first service identifier includes a first hash value based on a service name and timing information, wherein the timing information changes over time and those changes cause changes in the first hash value over time enhancing privacy of a service identified by the first service identifier and decreasing a likelihood of a third party monitoring use of the service, wherein the first hash value is generated by applying a first hash function;

means for transmitting the first message to a wireless device during a first discovery window, wherein the timing information comprises a portion of a first time stamp value, wherein the first time stamp value comprises a time stamp value of the first discovery window, and wherein the time stamp value is periodically sampled based on a start time of the first discovery window;

means for generating a second message, the second message comprising a second service identifier, wherein the second service identifier includes a second hash value based on the service name and a second time stamp value; and means for transmitting the second message.

16. The apparatus of claim 15, wherein the first hash value is further based on an encryption key.

17. The apparatus of claim 15, wherein the timing information comprises a value of a time interval counter.

18. The apparatus of claim 15, wherein the first message comprises one of: a publish service announcement message; a subscribe service request message; or a combination of the publish service announcement message and the subscribe service request message.

19. The apparatus of claim 15, further comprising:

means for generating a third message, the third message comprising a third service identifier, wherein the third service identifier includes a third hash value based at least in part on the first service identifier, wherein the third hash value is generated by applying a second hash function, and wherein applying the first hash function requires more computation than applying the second hash function.

20. A non-transitory computer-readable medium comprising code that, when executed, causes an apparatus to:

generate a first message comprising a first service identifier, wherein the first service identifier includes a first hash value based on a service name and timing information, wherein the timing information changes over time and those changes cause changes in the first hash value over time enhancing privacy of a service identified by the first service identifier and decreasing a likelihood of a third party monitoring use of the service, wherein the first hash value is generated by applying a first hash function;

transmit the first message to a wireless device during a first discovery window, wherein the timing information comprises a portion of a first time stamp value, wherein the first time stamp value comprises a time stamp value of the first discovery window, and wherein the time stamp value is periodically sampled based on a start time of the first discovery window;

generate a second message, the second message comprising a second service identifier, wherein the second service identifier includes a second hash value based on the service name and a second time stamp value; and transmit the second message.

21. The medium of claim 20, wherein the first hash function comprises a tiny encryption algorithm (TEA), and wherein the first hash value is further based on an encryption key.

22. The medium of claim 21, wherein the first hash value is further based on at least one of a second encryption key, a nonce, a cluster identifier (ID), and a transmitter medium access control (MAC) address.

* * * * *